United States Patent
Venkataraman et al.

(10) Patent No.: US 9,608,898 B2
(45) Date of Patent: Mar. 28, 2017

(54) METHOD AND APPARATUS FOR PERFORMING MULTICAST TRACES IN MPLS NETWORKS

(75) Inventors: Srikrishnan Venkataraman, Santa Clara, CA (US); Kanwar Singh, Mountain View, CA (US); Pradeep G. Jain, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1457 days.

(21) Appl. No.: 12/850,788

(22) Filed: Aug. 5, 2010

(65) Prior Publication Data

US 2012/0033667 A1 Feb. 9, 2012

(51) Int. Cl.
*H04L 12/761* (2013.01)
*H04L 12/753* (2013.01)
(Continued)

(52) U.S. Cl.
CPC .............. *H04L 45/16* (2013.01); *H04L 12/18* (2013.01); *H04L 45/48* (2013.01); *H04L 45/50* (2013.01)

(58) Field of Classification Search
USPC .................. 370/256, 270, 390, 432
See application file for complete search history.

(56) References Cited

U.S. PATENT DOCUMENTS 6,538,997 B1 * 3/2003 Wang et al. ............... 370/241
7,194,549 B1 * 3/2007 Lee et al. ................... 709/238
(Continued)

FOREIGN PATENT DOCUMENTS

DE WO 2006/037362 A1 * 4/2006

OTHER PUBLICATIONS

Saxena S et al: "Detecting Data Plane Failures in Point-to-Multipoint Multiprotocol Label Switching (MPLS)—Extensions to LSP Ping; draft-ietf-mpls-p2mp-1sp-ping-09.txt", Detecting Data Plane Failures in Point-to-Multipoint Multiprotocol Label Switching (MPLS)—Extensions to LSP Ping; Draft-IETF-MPLS-PMP-LSP-Ping-09.TXT, Internet Engineering Task Force, IETF; Standardworkingdraft, Internet Society (ISOC) 4, Rue Des, No. 9, Dec. 14, 2009 (Dec. 14, 2009), pp. 1-28, XP015065961, [retrieved on Dec. 14, 2009].
(Continued)

*Primary Examiner* — Hassan Phillips
*Assistant Examiner* — Saba Tsegaye
(74) *Attorney, Agent, or Firm* — Tong, Rea, Bentley & Kim, LLC

(57) ABSTRACT

A multicast path trace capability is provided for tracing a multicast path from a root node to a leaf node where the trace originates at the leaf node. The leaf node sends a multicast trace request to the root node. The root node receives the multicast trace request and initiates a path trace request for collecting path information associated with the multicast path. The root node receives at least one path trace response, in response to the path trace request, which includes path information associated with the multicast path. The root node sends a multicast trace response, including the collected path information, to the leaf node. The leaf node receives the multicast trace response including the path information. The leaf node derives end-to-end path information for the multicast path using the path information received in the multicast trace response. The multicast path trace capability may be used for tracing an MPLS multicast path (e.g., a P2MP LSP) from a root node to a leaf node of the MPLS multicast tree. The multicast path trace capability may be used for tracing multicast paths in other types of multicast networks.

8 Claims, 5 Drawing Sheets

(51) Int. Cl.
*H04L 12/18* (2006.01)
*H04L 12/723* (2013.01)

(56) References Cited

U.S. PATENT DOCUMENTS

| | | | | |
|---|---|---|---|---|
| 7,746,796 | B2* | 6/2010 | Swallow et al. | 370/249 |
| 2003/0145105 | A1* | 7/2003 | Desineni et al. | 709/238 |
| 2006/0203819 | A1* | 9/2006 | Farinacci et al. | 370/390 |
| 2006/0239289 | A1* | 10/2006 | Zheng et al. | 370/432 |
| 2007/0025277 | A1* | 2/2007 | Sajassi et al. | 370/256 |
| 2007/0297406 | A1* | 12/2007 | Rooholamini | 370/390 |
| 2010/0272106 | A1* | 10/2010 | Pan | 370/390 |

OTHER PUBLICATIONS

Quittek J et al: "Definitions of Managed Objects for Remote Ping, Traceroute, and Lookup Operations; rfc4560.txt", 5. JCT-VC Meeting; 96. MPEG Meeting; Mar. 16-23, 2011; Geneva; (Joint Collaborative Team on Video Coding of ISO/IEC JTC1/SC29/WG11AND ITU-T SG.16); URL: http://wftp3.itu.int/av-arch/jctvc-site/, Internet Engineering Task Force, IETF, CH, Jun. 1, 2006 (Jun. 1, 2006 ), XP015046281, ISSN: 0000-0003.

Fenner Xerox Parc W: "Internet Group Management Protocol, Version 2; rfc2236.txt", 5. JCT-VC Meeting; 96. MPEG Meeting; Mar. 16-23, 2011; Geneva; (Joint Collaborative Team on Video Coding of ISO/IEC JTC1/SC29/WG11AND ITU-T SG.16); URL: http://wftp3.itu.int/av-arch/jctvc-site/, Internet Engineering Task Force, IETF, CH, Nov. 1, 1997 (Nov. 1, 1997), XP015008020, ISSN: 0000-0003.

Asaeda Keio University T Jinmei Isc W Fenner Arastra H et al: "Mtrace Version 2: Traceroute Facility for IP Multicast; draft-ietf-mboned-mtrace-v2-07.txt", Mtrace Version 2: Traceroute Facility for IP Multicast; Draft-IETF-MBONED-MTRACE-V2-07.TXT, Internet Engineering Task Force, IETF; Standardworkingdraft, Internet Society (ISOC) 4, Rue Des Falaises CH-1205 Geneva, Switzerland, No. 7, Jul. 12, 2010 (Jul. 12, 2010), pp. 1-39, XP015070025, [retrieved on Dec. 7, 2010].

Kompella Juniper Networks K et al: "Detecting Multi-Protocol Label Switched (MPLS) Data Plane Failures; rfc4379.txt", 5. JCT-VC Meeting; 96. MPEG Meeting; Mar. 16-23, 2011; Geneva; (Joint Collaborative Team on Video Coding of ISO/TEC JTC1/SC29/WG11AND ITU-T SG.16); URL: http://wftp3.itu.int/av-arch/jctvc-site/, Internet Engineering Task Force, IETF, CH, Feb. 1, 2006 (Feb. 1, 2006), XP015044611, ISSN: 0000-0003.

The International Search Report and The Written Opinion of the International Searching Authority, or the Declaration, mailed Nov. 25, 2011, in PCT/US2011/044318, Alcatel-Lucent USA Inc., Applicant, 12 pages.

Internet Engineering Task Force (IETF) standard, H. Asaeda et al., ("Mtrace Version 2: Traceroute Facility for IP Multicast," http://tools.ietf.org/html/draft-ietf-mboned-mtrace-v2-07); Jul. 12, 2010.

IETF standard, S. Saxena et al.,"Detecting Data Plane Failures in Point-to-Multipoint Multiprotocol Label Switching (MPLS)—Extensions to LSP Ping" http://tools.ietf.org/html/draft-ietf-mpls-p2mp-lsp-ping-10; Mar. 7, 2010.

\* cited by examiner

METHOD AND APPARATUS FOR PERFORMING MULTICAST TRACES IN MPLS NETWORKS

FIELD OF THE INVENTION

The invention relates generally to communication networks and, more specifically but not exclusively, to tracing multicast paths in multicast communication networks.

BACKGROUND

In Internet Protocol (IP) multicast networks, the multicast trace (mtrace) tool is used to trace the path that IP multicast packets take from a source to a destination. The mtrace tool is specified by an Internet Engineering Task Force (IETF) standard ("Mtrace Version 2: Traceroute Facility for IP Multicast," http://tools.ietf.org/html/draft-ietf-mboned-mtrace-v2-07) which allows the tracing of IP multicast routing paths, in order to trace the path that an IP multicast packet would take from some source to some destination. With the evolution and acceptance of Multiprotocol Label Switching (MPLS) in Service Provider Networks, for transporting multicast applications over MPLS Label Switched Paths (LSPs) using Point-To-Multipoint (P2MP) LSPs which are established using Resource Reservation Protocol (RSVP) signaling, there is a need to enhance the above-described mtrace tool to trace the path for a given multicast flow from root node to leaf node.

SUMMARY

Various deficiencies in the prior art are addressed by embodiments for providing a multicast path trace capability adapted for tracing a multicast path from a root node to a leaf node where the trace originates at the leaf node. The leaf node sends a multicast trace request to the root node. The root node receives the multicast trace request and initiates a path trace request for collecting path information associated with the multicast path. The root node receives at least one path trace response, in response to the path trace request, which includes path information associated with the multicast path. The root node sends a multicast trace response, including the collected path information, to the leaf node. The leaf node receives the multicast trace response including the path information. The leaf node derives end-to-end path information for the multicast path using the path information received in the multicast trace response. The multicast path trace capability may be used for tracing an MPLS multicast path (e.g., a Point-to-Multipoint (P2MP) Label Switched Path (LSP)) from a root node to a leaf node of the MPLS multicast tree. The multicast path trace capability may be used for tracing multicast paths in other types of multicast networks.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A multicast path trace capability is depicted and described herein. The multicast path trace capability enables the tracing of a multicast path of a multicast network from the root node to the leaf node via the multicast network where the trace originates at the leaf node. The multicast path trace capability complements the existing mtrace tool (Internet Engineering Task Force (IETF) standard "Mtrace Version 2: Traceroute Facility for IP Multicast" which is incorporated herein by reference in its entirety), providing similar operational and management capabilities for MPLS-based multicast networks and other suitable multicast networks.

Figure 1A:
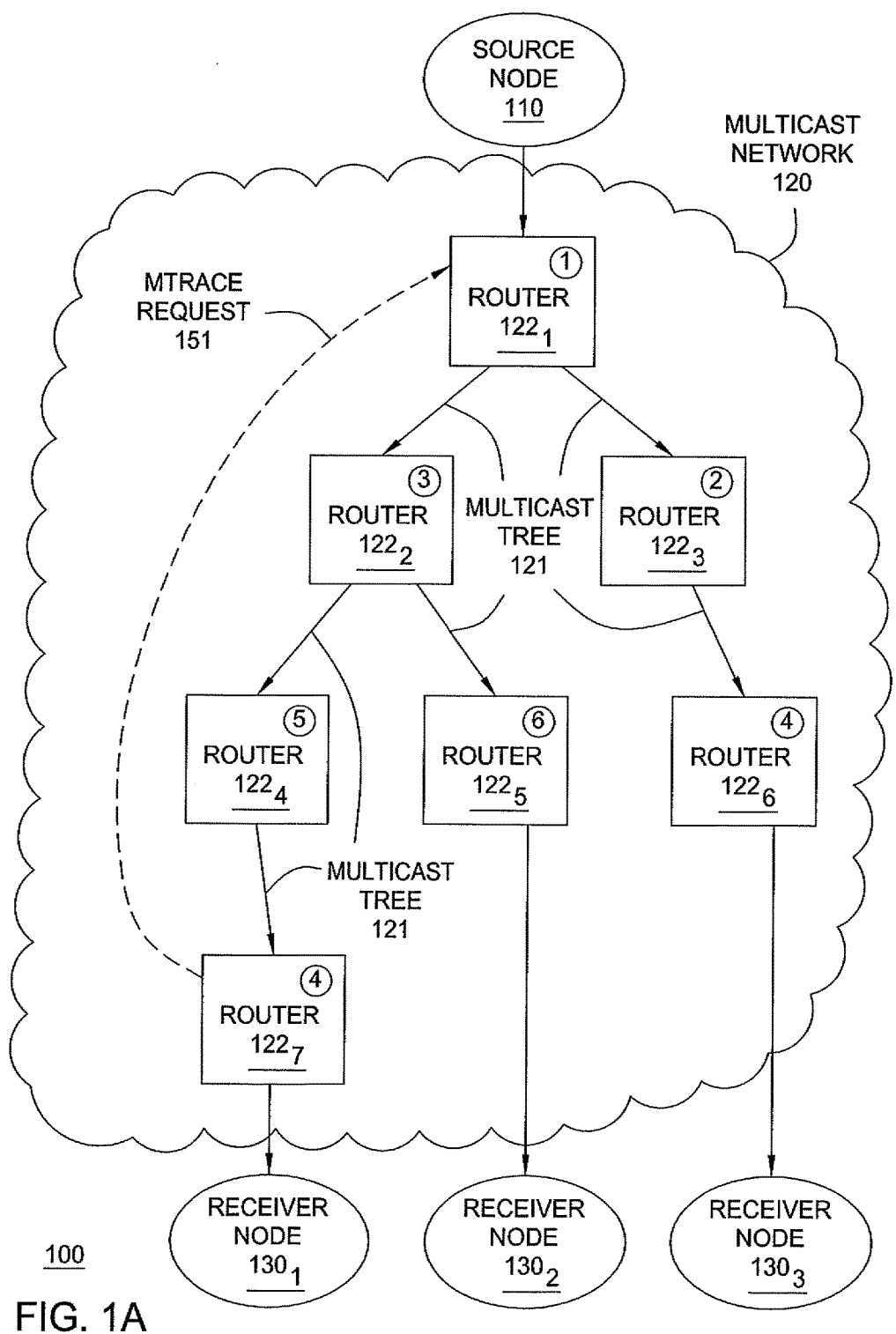
FIGS. 1A-1C depict high-level block diagrams of an exemplary multicast network, illustrating a process for tracing a multicast path from a root node to a leaf node.
Figure 1B:
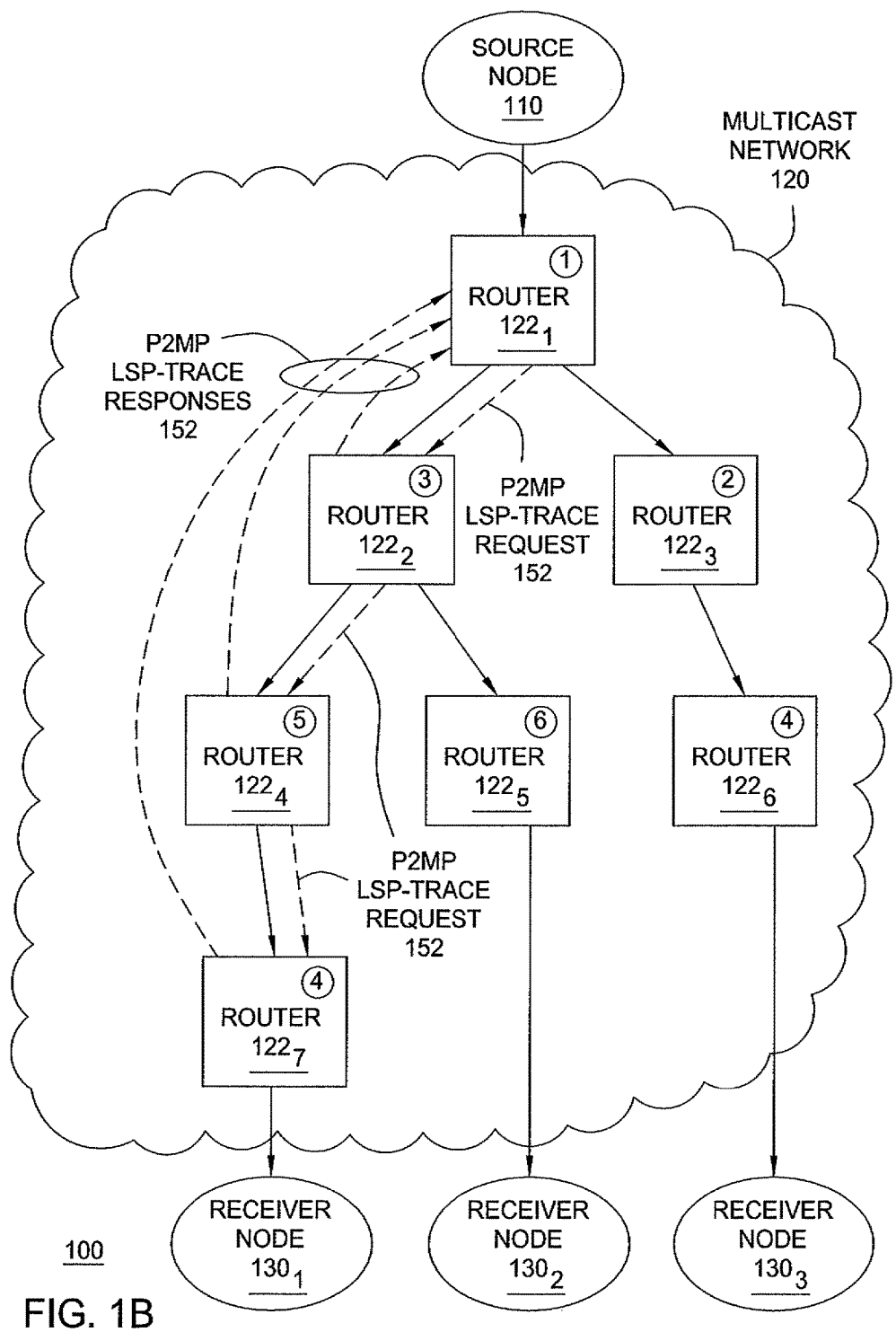
Figure 1C:
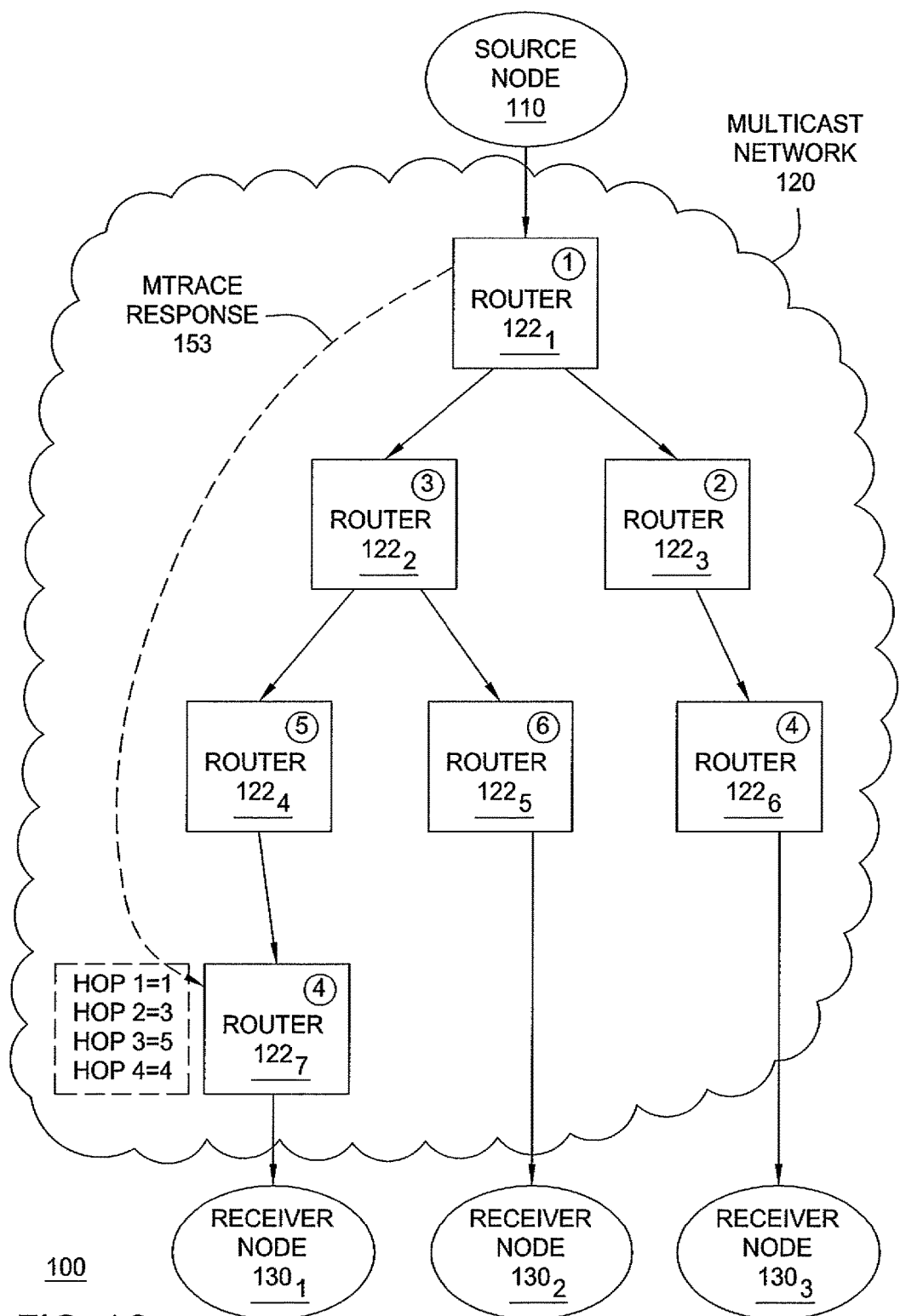

FIGS. 1A-1C depict high-level block diagrams of an exemplary multicast network, illustrating a process for tracing a multicast path from a root node to a leaf node.

As depicted in FIGS. 1A-1C, exemplary multicast network 100 includes a source node 110, a multicast network 120 supporting a multicast tree 121 using a plurality of routers $122_1$-$122_7$ (collectively, routers 122), and a plurality of receiver nodes $130_1$-$130_3$ (collectively, receiver nodes 130). The source node 110 distributes multicast traffic to the receiver nodes 130 via the multicast tree 121 supported by the routers 122 of multicast network 120.

As depicted in FIGS. 1A-1C, the source node 110 distributes the multicast traffic to the router $122_1$. The multicast tree 121 is arranged as follows: (1) router $122_1$ distributes the multicast traffic to routers $122_2$ and $122_3$, (2) router $122_2$ distributes the multicast traffic to routers $122_4$ and $122_5$, (3) router $122_3$ distributes the multicast traffic to router $122_6$, and (4) router $122_4$ distributes the multicast traffic to router $122_7$. The routers $122_5$, $122_6$, and $122_7$ distribute the multicast traffic to receiver nodes $130_1$, $130_2$, and $130_3$, respectively. In this arrangement, router $122_1$ is the root node of the multicast tree 121 and routers $122_5$, $122_6$, and $122_7$ each are leaf nodes of the multicast tree 121.

The source node 110 distributes multicast traffic to multicast network 120 for multicasting of the multicast traffic to receiver nodes 130. The source node 110 may distribute the multicast traffic in any suitable manner. In one embodiment, for example, source node 110 distributes the multicast traffic as IP multicast packets using a unique IP multicast address for the multicast tree 121 of multicast network 120. The source node 110 may obtain the multicast traffic from any suitable source (e.g., locally where the traffic is stored on source node 110, from one or more other network elements, and the like).

The multicast network 120 receives the multicast traffic from source node 110 and multicasts the multicast traffic for delivery to receiver nodes 130. The multicast network 120 may be any suitable type of network utilizing any suitable multicast capabilities. In one embodiment, for example, multicast network 120 is an IP/MPLS network configured for supporting multicasting of traffic using Point-to-Multipoint (P2MP) Label Switched Paths (LSPs). In this embodiment, the multicast tree 121 is a P2MP LSP tree configured for providing multicast traffic from the root node (illustratively, router $122_1$) to the leaf nodes (illustratively, routers $120_5$, $120_6$, and $120_7$). The various characteristics of P2MP LSPs will be understood by one skilled in the art.

The root node $120_1$ is a network ingress node and, in general, in an embodiment in which the multicast tree 121 is a P2MP LSP tree, a network ingress node may be a node at which: (1) the P2MP LSP tree originates, and (2) traffic, received from the source node 110 as IP multicast packets, is encapsulated with MPLS labels using MPLS and propagated over the P2MP LSP tree. The leaf nodes $120_5$, $120_6$, and $120_7$ each are network egress nodes and, in general, in an embodiment in which the multicast tree 121 is a P2MP LSP tree, a network egress node may be a node at which: (1) the P2MP LSP tree terminates, and (2) MPLS label encapsulation is removed and the multicast traffic, as IP multicast packets, is propagated on one or more local outgoing interfaces to potential receivers of the multicast traffic (illustratively, receiver nodes 130).

The receiver nodes 130 receive the multicast traffic from multicast network 130. The receiver nodes 130 may be the intended destinations of the multicast traffic and/or may further distribute the multicast traffic downstream to one or more other network elements for which the multicast traffic is intended.

As described herein, FIGS. 1A-1C illustrate a process for tracing a multicast path from a root node to a leaf node, where the trace is originated by the leaf node (illustratively, for tracing a multicast path from router $122_1$ to router $122_7$ where the trace is originated by router $122_7$). In this exemplary embodiment, the multicast path is an MPLS LSP of a P2MP LSP tree.

As depicted in FIG. 1A, at step 151, the leaf node issues a multicast trace request (also referred to herein as an mtrace request) which is routed to the root node via the multicast network 120. The mtrace request is configured to enable the leaf node to request tracing of the multicast path from the root node to the leaf node. The mtrace request may be formatted in any suitable manner. In one embodiment, the mtrace request is a new type of mtrace request packet having a new Internet Group Management Protocol (IGMP) Message Type. For example, the new IGMP Message Type may be designated as "mtrace request for P2MP MPLS Network" or using any other suitable designator. In one embodiment, the mtrace request is routed from the leaf node to the root node via a unicast path.

As depicted in FIG. 1B, at step 152, the root node, upon receiving the mtrace request from the leaf node, performs a P2MP LSP-Trace for tracing the multicast path from the root node to the leaf node from which the mtrace request is received (via multicast tree 121).

In one embodiment, the P2MP LSP-Trace is performed as specified in the IETF standard "Detecting Data Plane Failures in Point-to-Multipoint Multiprotocol Label Switching (MPLS)—Extensions to LSP Ping" which is incorporated herein by reference in its entirety.

The P2MP LSP-Trace enables the root node to collect path information associated with the multicast path traced from the root node to the leaf node.

The root node issues a path trace request (referred to herein as an LSP Trace request), which is propagated from the root node to the leaf node via the multicast network 120. The LSP Trace request is propagated from the root node to the leaf node via the multicast path from the root node to the leaf node, which may include one or more transit nodes. The transit nodes and leaf node of the multicast path each reply to the LSP Trace request with respective path trace responses (referred to herein as LSP Trace responses) including respective portions of the path information associated with the multicast path traced from the root node to the leaf node. As depicted in FIG. 1B, the LSP Trace request is propagate from router $122_1$ to router $122_7$ via routers $122_2$ and $122_4$ which are the transit nodes of the path.

The path information collected as part of a P2MP LSP-Trace may include any suitable information which may be collected as part of a P2MP LSP-Trace.

In one embodiment, for example, the path information includes the hop information of each node along the path from the root node to the leaf node (illustratively, the hop information of routers $122_1$, $122_2$, $122_4$, and $122_7$). As depicted in FIGS. 1A-1C, the hop values of the routers $122_1$-$122_7$ are 1, 3, 2, 5, 6, 4, and 4, respectively.

In one embodiment, for example, the path information includes packet statistics of nodes along the multicast path from the root node to the leaf node. In one such embodiment, a new Target Forwarding Equivalence Class (FEC) Stack TLV can be added to the LSP Trace request for communicating a request for this information to each of the transit nodes between the root node and the leaf node (illustratively, routers $122_2$ and $122_4$). In this embodiment, each transit node, upon receiving the new Target FEC Stack TLV, appends the requested information (i.e., the requested packet statistics) to the LSP Trace response provided from the transit node back to the root node.

The P2MP LSP-Trace may enable the root node to collect any other suitable types of path information associated with the multicast path traced from the root node to the leaf node.

The result of the P2MP LSP-Trace performed by the root node is path information for the multicast path from the root node to the leaf node from which the mtrace request is received.

As depicted in FIG. 1C, at step 153, the root node, upon completion of the P2MP LSP-Trace (i.e., such that the root node has the path information for the multicast path from the root node to the leaf node from which the mtrace request is received), sends a multicast trace response (also referred to herein as an mtrace response) to the leaf node from which the mtrace request is received via the multicast network 120. The mtrace response is configured to enable the root node to respond to the leaf node with the results of the tracing of the multicast path from the root node to the leaf node. The mtrace response may be formatted in any suitable manner. In one embodiment, the mtrace response is a new type of mtrace response packet having a new Internet Group Management Protocol (IGMP) Message Type. For example, the new IGMP Message Type may be designated as "mtrace response for P2MP MPLS Network" or using any other suitable designator. In one embodiment, the mtrace response is routed from the leaf node to the root node via a unicast path. The mtrace response includes the path information collected by the root node via execution of the P2MP LSP-Trace. As depicted in FIG. 1C, for example, the path information included in the mtrace response is the hop information as follows: Hop 1=1; Hop 2=3; Hop 3=5; Hop 4=4.

The leaf node, upon receiving the mtrace response, may use the path information included in the mtrace response for any suitable purpose(s). In one embodiment, for example, the leaf node uses the path information included in the mtrace response to derive the end-to-end path information associated with the MPLS path that the multicast flow is taking from the root node to the leaf node. The leaf node may use the path information included in the mtrace response for any other suitable purpose(s).

Figure 2:
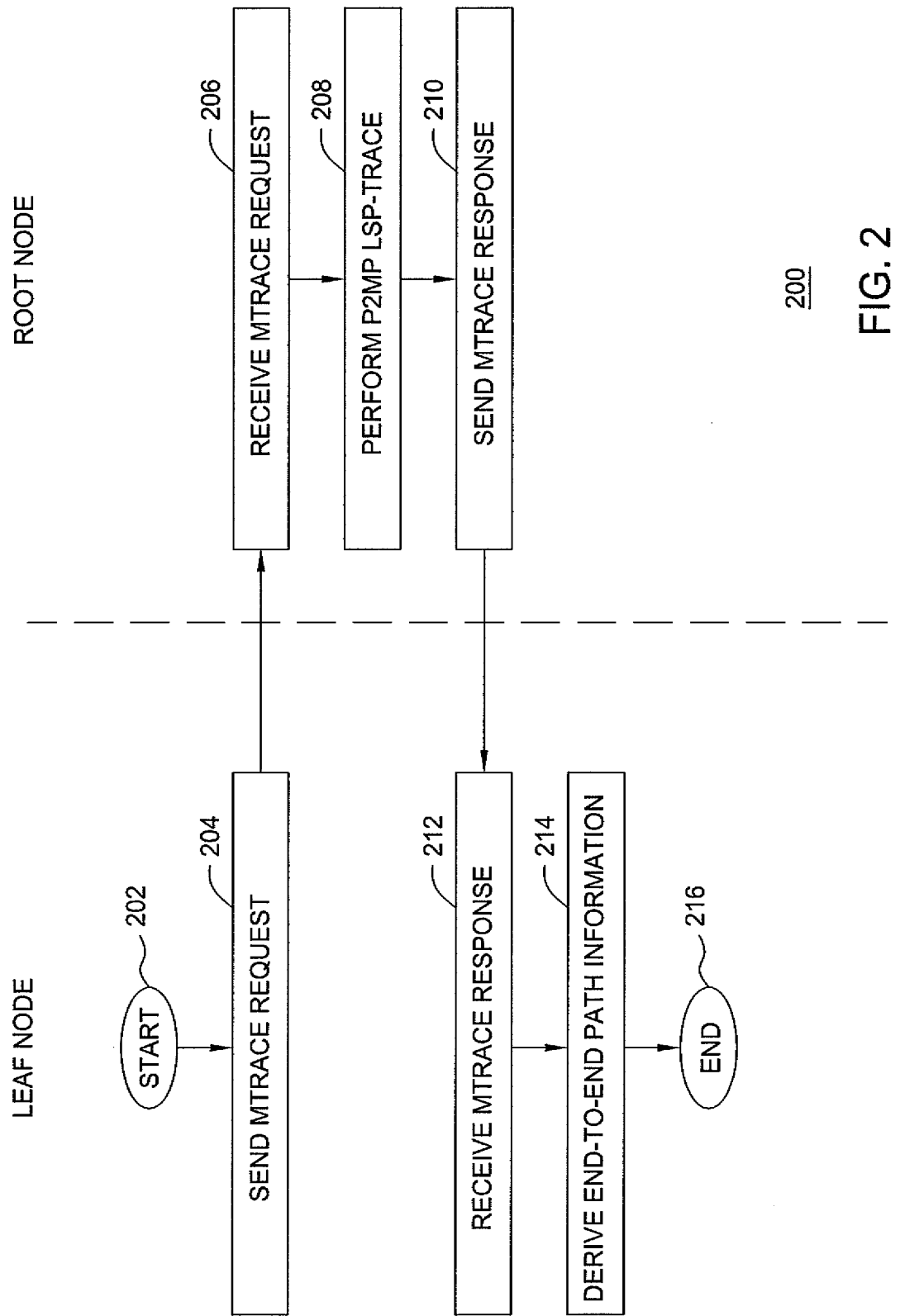
FIG. 2 depicts one embodiment of a method for tracing a multicast path from a root node to a leaf node.

FIG. 2 depicts one embodiment of a method for tracing a multicast path from a root node to a leaf node. As depicted in FIG. 2, a portion of the steps are performed by the leaf node and a portion of the steps are performed by the root node. Accordingly, it will be appreciated that, although depicted as a single method, the leaf and root nodes each may be configured to support respective portions of the method for tracing a multicast path from a root node to a leaf node.

At step 202, method 200 begins.

At step 204, the leaf node sends an mtrace request intended for the root node. The mtrace request is a request by the leaf node to trace the multicast path from the root node to the leaf node.

At step 206, the root node receives the mtrace request.

At step 208, the root node performs a P2MP LSP-Trace to the leaf node. The root node issues a P2MP LSP-Trace request which is routed along the multicast path. The root node receives P2MP LSP-Trace responses from the nodes along the multicast path. The P2MP LSP-Trace responses include path information associated with the multicast path.

At step 210, the root node sends an mtrace response intended for the leaf node. The mtrace response includes the path information collected by the root node while performing the P2MP LSP-Trace.

At step 212, the leaf node receives the mtrace response.

At step 214, the leaf node derives, based on the path information included in the mtrace response, end-to-end path information for the multicast path traced from the root node to the lead node.

At step 216, method 200 ends.

Although depicted and described as ending, it will be appreciated that the leaf node, upon deriving the end-to-end path information of the multicast path, may perform any other suitable actions using the path information received in the mtrace response and/or using the end-to-end path information derived based on the path information received in the mtrace response.

In this manner, the multicast path trace capability depicted and described herein provides a mechanism by which to trace the path that a multicast flow is taking in an MPLS network, where the trace is leaf-originated and based on a particular Source, Group (S,G) combination.

As described herein, the existing mtrace tool specifies a procedure for tracing IP multicast paths from a root node to a leaf node, but does not support tracing of a multicast path from the root node to the leaf node in MPLS networks or other multicast networks. The multicast path trace capability depicted and described herein enables similar operational and management capabilities for MPLS-based multicast networks. This is beneficial given the evolution and acceptance of MPLS in service provider networks for transporting multicast applications over MPLS LSPs using P2MP LSPs which are established using RSVP signaling. This also is beneficial for various other reasons.

Although primarily depicted and described herein with respect to use of the IETF standard "Detecting Data Plane Failures in Point-to-Multipoint Multiprotocol Label Switching (MPLS)—Extensions to LSP Ping" for tracing the multicast path from the root node to the leaf node, it will be appreciated that any other suitable multicast path trace capability may be used.

Although primarily depicted and described herein with respect to tracing multicast paths from root node to leaf node for specific types of multicast networks supporting specific types of multicast paths (e.g., for the tracing of P2MP LSP paths in MPLS networks), it will be appreciated that the multicast path trace capability may be adapted for use in tracing any suitable multicast paths in any suitable types of multicast networks.

Figure 3:
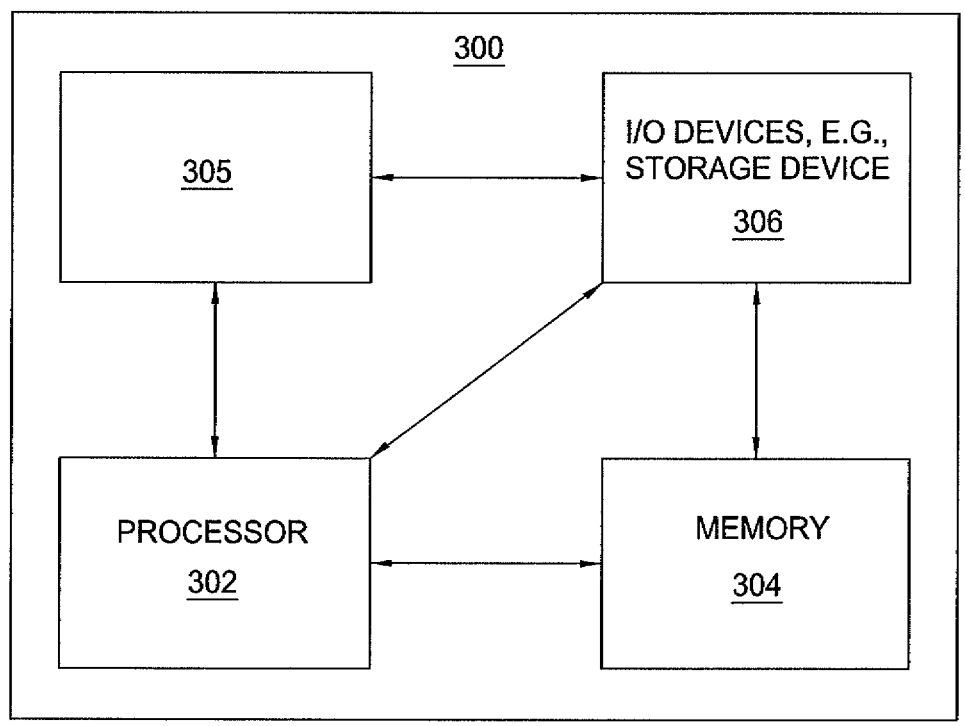
FIG. 3 depicts a high-level block diagram of a computer suitable for use in performing the functions described herein.

FIG. 3 depicts a high-level block diagram of a computer suitable for use in performing functions described herein.

As depicted in FIG. 3, computer 300 includes a processor element 302 (e.g., a central processing unit (CPU) and/or other suitable processor(s)), a memory 304 (e.g., random access memory (RAM), read only memory (ROM), and the like), an cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 305 can be loaded into memory 304 and executed by processor 302 to implement the functions as discussed herein. Thus, cooperating process 305 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for tracing a multicast path between a root node and a leaf node of a multicast tree in a multicast network, the method comprising:
   receiving, at the root node, a multicast trace request comprising an indication of a request by the leaf node for the root node to initiate tracing of the multicast path from the root node to the leaf node;
   initiating, from the root node based on the multicast trace request, a path trace request adapted for tracing the multicast path from the root node to the leaf node;
   receiving, at the root node, at least one path trace response associated with the path trace request, wherein the path trace response comprises path information associated with the multicast path; and
   propagating a multicast trace response toward the leaf node, wherein the multicast trace response includes at least a portion of the path information from the at least one path trace response.

2. The method of claim 1, wherein the multicast trace request comprises an Internet Group Management Protocol (IGMP) Message Type indicative that the multicast trace request is an mtrace request for a Point-to-Multipoint (P2MP) Multiprotocol Label Switching (MPLS) network.

3. The method of claim 1, wherein the path trace request initiated from the root node is a request for a Point-to-Multipoint (P2MP) Label Switched Path (LSP)-Trace.

4. The method of claim 3, wherein the P2MP LSP-Trace includes a Target Forwarding Equivalence Class (FEC) Stack TLV adapted for indicating to a transit node of the multicast path that the root node is requesting packet statistics associated with the multicast path.

5. The method of claim 1, wherein the path information comprises at least one of hop information and packet statistics.

6. The method of claim 1, wherein the multicast trace response comprises an Internet Group Management Protocol (IGMP) Message Type indicative that the multicast trace response is an mtrace response for a Point-to-Multipoint (P2MP) Multiprotocol Label Switching (MPLS) network.

7. The method of claim 1, wherein the network is a Multiprotocol Label Switching (MPLS) network, wherein the multicast path is a Point-to-Multipoint (P2MP) Label Switched Path (LSP).

8. An apparatus for tracing a multicast path between a root node and a leaf node of a multicast tree in a multicast network, comprising:
  a processor and a memory communicatively connected to the processor, the processor configured for:
    receiving, at the root node, a multicast trace request comprising an indication of a request by the leaf node for the root node to initiate tracing of the multicast path from the root node to the leaf node;
    initiating, from the root node based on the multicast trace request, a path trace request adapted for tracing the multicast path from the root node to the leaf node;
    receiving, at the root node, at least one path trace response associated with the path trace request, wherein the path trace response comprises path information associated with the multicast path; and
    propagating a multicast trace response toward the leaf node, wherein the multicast trace response includes at least a portion of the path information from the at least one path trace response.

\* \* \* \* \*